(12) United States Patent
Elorriaga Vicario et al.

(10) Patent No.: US 6,311,478 B1
(45) Date of Patent: Nov. 6, 2001

(54) GUIDING MECHANISM FOR VARIABLE GEOMETRY VECTORING NOZZLES

(75) Inventors: Javier Elorriaga Vicario; Miguel Villanueva Salazar, both of Getxo (ES)

(73) Assignee: Industria de Turbo, S.A., Zamudio (ES)

( * ) Notice: Subject to any disclaimer, the term of this patent is extended or adjusted under 35 U.S.C. 154(b) by 0 days.

(21) Appl. No.: 09/388,651

(22) Filed: Sep. 2, 1999

(30) Foreign Application Priority Data

Sep. 4, 1998 (ES) .................................... 9801872

(51) Int. Cl.[7] .................................................. F02K 3/00
(52) U.S. Cl. ................................................. 60/232
(58) Field of Search ................ 60/228, 232; 239/265.35, 239/265.33, 265.11

(56) References Cited

U.S. PATENT DOCUMENTS 5,329,763 * 7/1994 Mendia et al. ..................... 60/232
5,613,636 * 3/1997 Zubillaga et al. ............... 239/265.35

* cited by examiner

Primary Examiner—Charles G. Freay
Assistant Examiner—William H Rodriguez
(74) Attorney, Agent, or Firm—Darby & Darby

(57) ABSTRACT

Guiding mechanism for variable geometry vectoring nozzles, applicable to gas turbines, capable of transmitting tangential forces acting on the external ring under vectoring loads onto the inner ring, avoiding the need of a joint between the outer ring and the nozzle structure. With this purpose a guiding track (9) oriented circumferentially around the pivoting axis (8) is incorporated onto the outer ring (3) and a track (10) oriented around a second axis (6) perpendicular to the previous is incorporated on the intermediate ring (2). The sledge element (11) joint to the intermediate ring (2), slides along the track (9) as a result of vectoring around the axis (8). For vectoring around axis (6) the sledge element (12), joint to the inner ring (1) slides over the track (10).

6 Claims, 6 Drawing Sheets

GUIDING MECHANISM FOR VARIABLE GEOMETRY VECTORING NOZZLES

Figure 1:
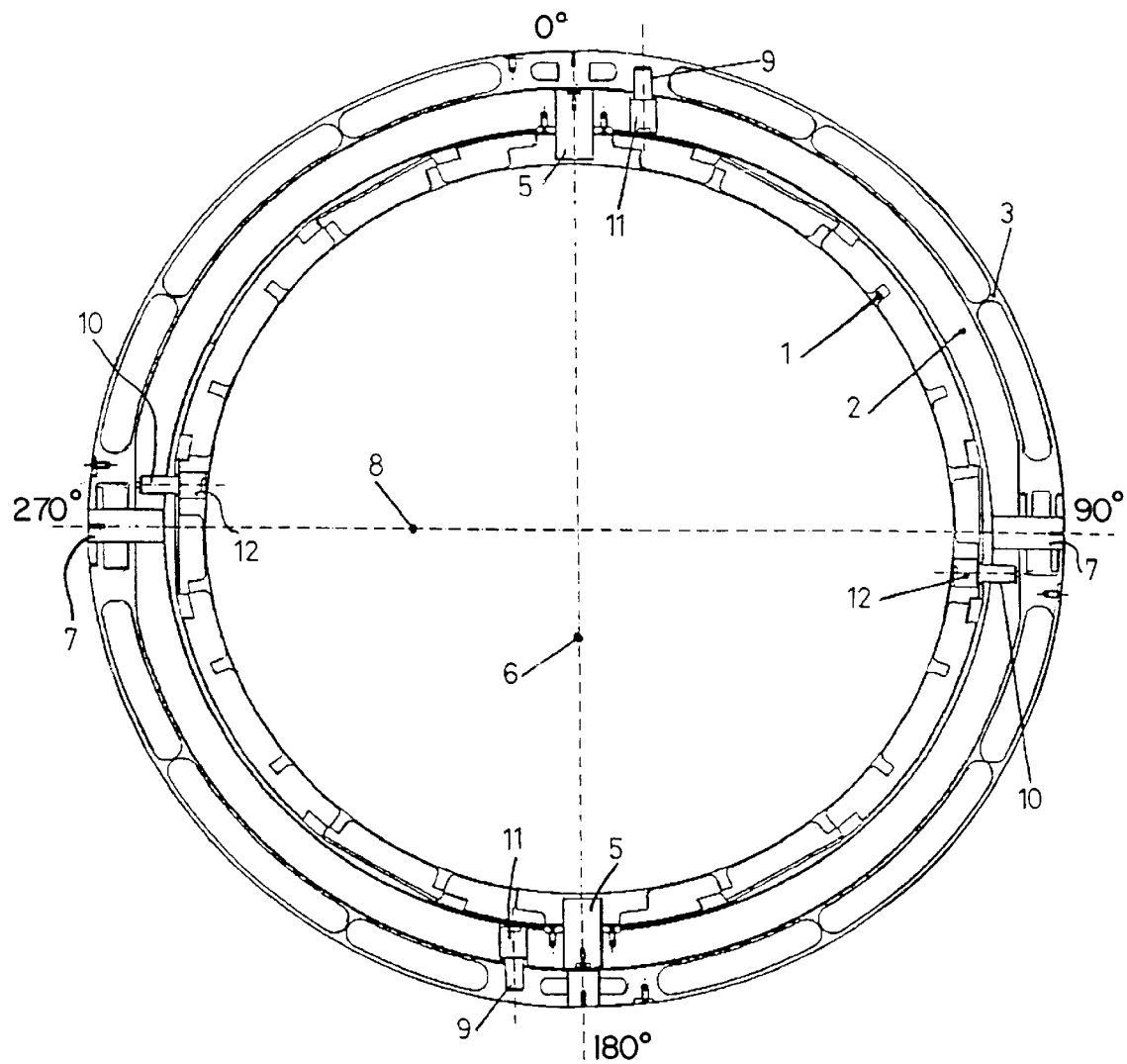

The present invention refers to an actuation mechanism for vectoring nozzles of variable geometry, for gas turbines used as propulsion systems in aviation.

The maneuverability of the airplanes is an essential factor. This maneuverability, which has been achieved up to date by aerodynamic forces, can substantially be improved by vectoring the thrust away from its conventional axial orientation The vectoring of the thrust has been employed historically in rocket engines. In this applications vectoring is much simpler due to the fixed geometry of the nozzles.

Convergent divergent nozzles with variable geometry have been incorporated relatively recently on supersonic aircraft powered by jet engines or turbo fans.

For this type of nozzles the systems capable of vectoring thrust are not yet operational but rather on a stage of research and development. Those which are more advanced are of the two dimensional type, in which thrust vectoring is only achieved in one plane It is of special interest to orientate the thrust in nozzles with axisymmetric geometry, because it allows to vector the thrust in any axial plane, and on those of special importance; the pitch and yaw planes.

There are several known mechanism for vectoring thrust in this type of nozzles, since it is possible to do it by different means, even though it is difficult to achieve enough simplicity.

Mechanism of the mentioned type are described in Spanish patent ES 9200369 and its equivalent American patent U.S. Pat. No. 5,329,763 and European EP 0557229 and also on the U.S. Pat. No. 5,613,636.

The patent ES 0557229 refers to a vectoring nozzle of variable geometry for gas turbines, consisting of a convergent section, followed in the thrust direction by a divergent section, both made up of master and slave petals. The convergent section defines a variable geometry throat, and the divergent section is of variable geometry to vector the thrust. The nozzle includes devices to vary the throat area and devices to vary the thrust orientation, being both devices made up a unique mechanism consisting of three annular rings, concentric between them and with the engine axis, and by a number of linear actuators. Each two consecutive parts from the three annular rings are joint in an arrangement of three elements with diametric axis perpendicular between them as in a cardan or universal joint. The external annular ring can be a single part or two halves joined by a cylindrical joint with its axis coincident with the joint between external and intermediate rings.

With this arrangement a nozzle capable of fulfilling the following functions is obtained: a) simultaneous axisymmetric variation, according to a fixed ratio, of the convergent section throat area and the divergent section exit area; b) simultaneous variation of all the geometry of the divergent section exit area, independently of the throat area; and c) asymmetric orientation of thrust.

The Spanish patent number 9401114 refers to a nozzle of the described type that can achieve a fourth function that adds to the already mentioned, consisting of the independent variation of the divergent section exit area independently of the convergent section throat area. This is achieved by the special arrangement of the external ring, consisting of two or more sectors joined between them, together with an actuation mechanism that allows, by the independent rotation of one of the ring segments, the asymmetric correction of the divergent section exit area during a vectorization, while the remaining sections of the ring remain static.

In both cases the external ring is related to the fixed structure by a guiding mechanism. This arrangement allows the external ring to withstand the tangential forces that result from vectoring the thrust, and transmit them to the fixed structure.

The present invention objective is to define an arrangement of a thrust vectoring nozzle of variable geometry, of the mentioned type, with a simplified and reduced number of elements for transmitting the tangential forces that act on the external ring as a result of divergent section vectoring, onto the engine structure.

For this purpose the invention summarizes an alternative guiding system between the annular rings that make up the actuation mechanism of the convergent section throat area and the geometry of the divergent section.

With more detail, the invention proposes a guiding system between gas turbine propulsion variable geometry vectoring nozzle annular rings, capable of withstanding the tangential loads on the outer ring that result from vectoring, and transmit them to the internal ring, without the need of a guiding system between the external ring and the fixed structure.

The mechanism of the invention is characterized because it includes elements capable of guiding the relative rotation between connecting rings, allowing the transmission of tangential loads acting on the external ring as a result of vectoring of thrust, onto the internal ring, avoiding the need of a direct joint between the external ring and the nozzle structure.

The mentioned devices, by which the relative movement between each two consecutive rings is conducted, consists in at least one roller or sliding track located in one of the rings and of a roller or sledge mounted on the other, being the roller or sledge elements positioned against the track in which it rolls or slides. The tract is orientated circumferencially around the rotation axis between the two rings being considered.

Preferably each couple of consecutive rings is related by two tracks and an equal number of associated sledges or rollers. The two tracks are preferably located at opposite diametral positions and preferably at opposite sides of the plane perpendicular to the axis of rotation.

These main advantages and other features and benefits will be more easily understood in the following description together with the appended drawings, in which the arrangement of the guiding mechanism according to the principles of the invention, has been represented as a non limiting example.

FIG. 1 is a section perpendicular to the engine axis showing an actuation mechanism as described in the patent ES 9200369, in which the invention guiding elements between intermediate and external ring and between intermediate and internal ring have been incorporated.

Figure 2:
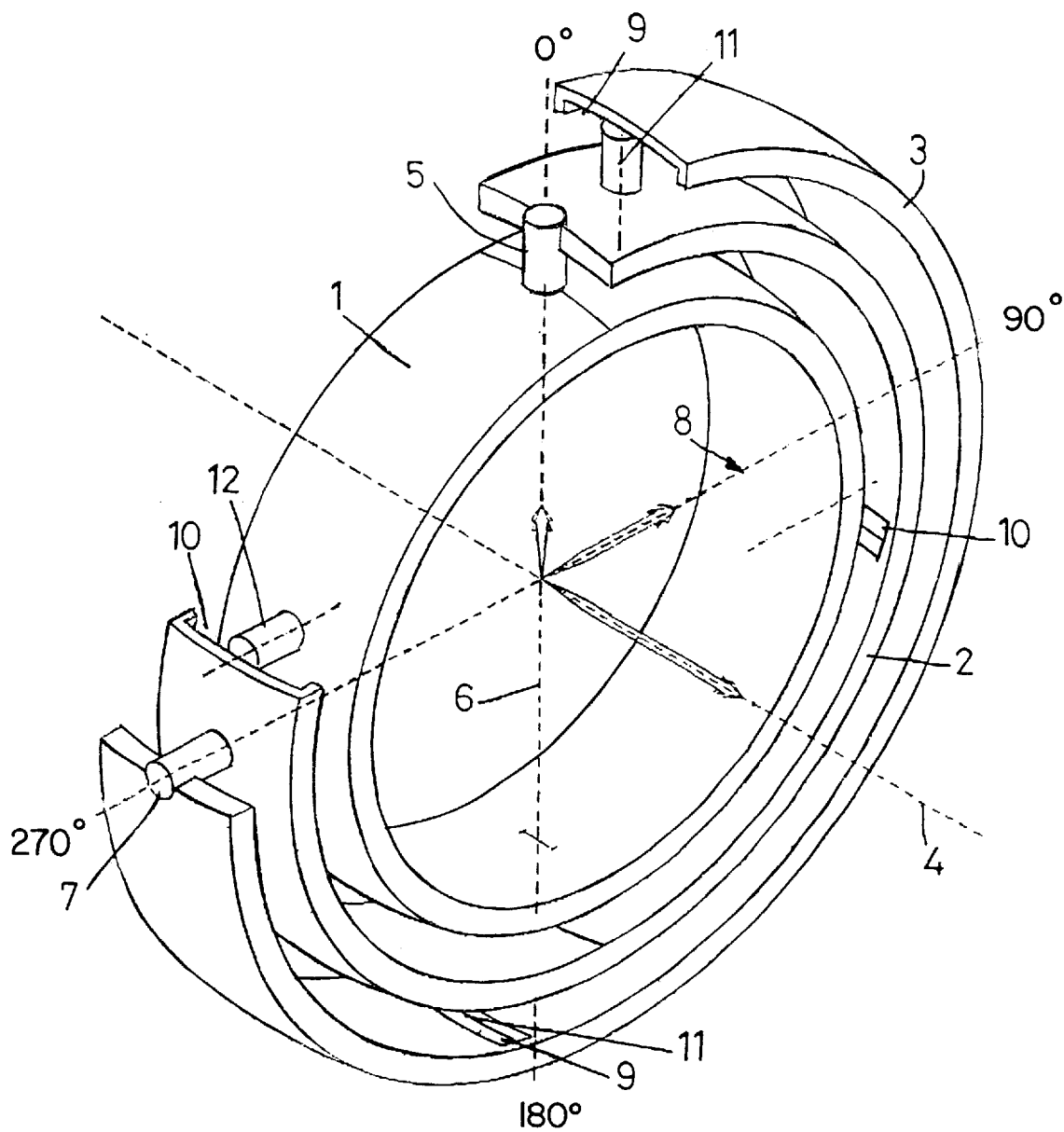
Figure 3:
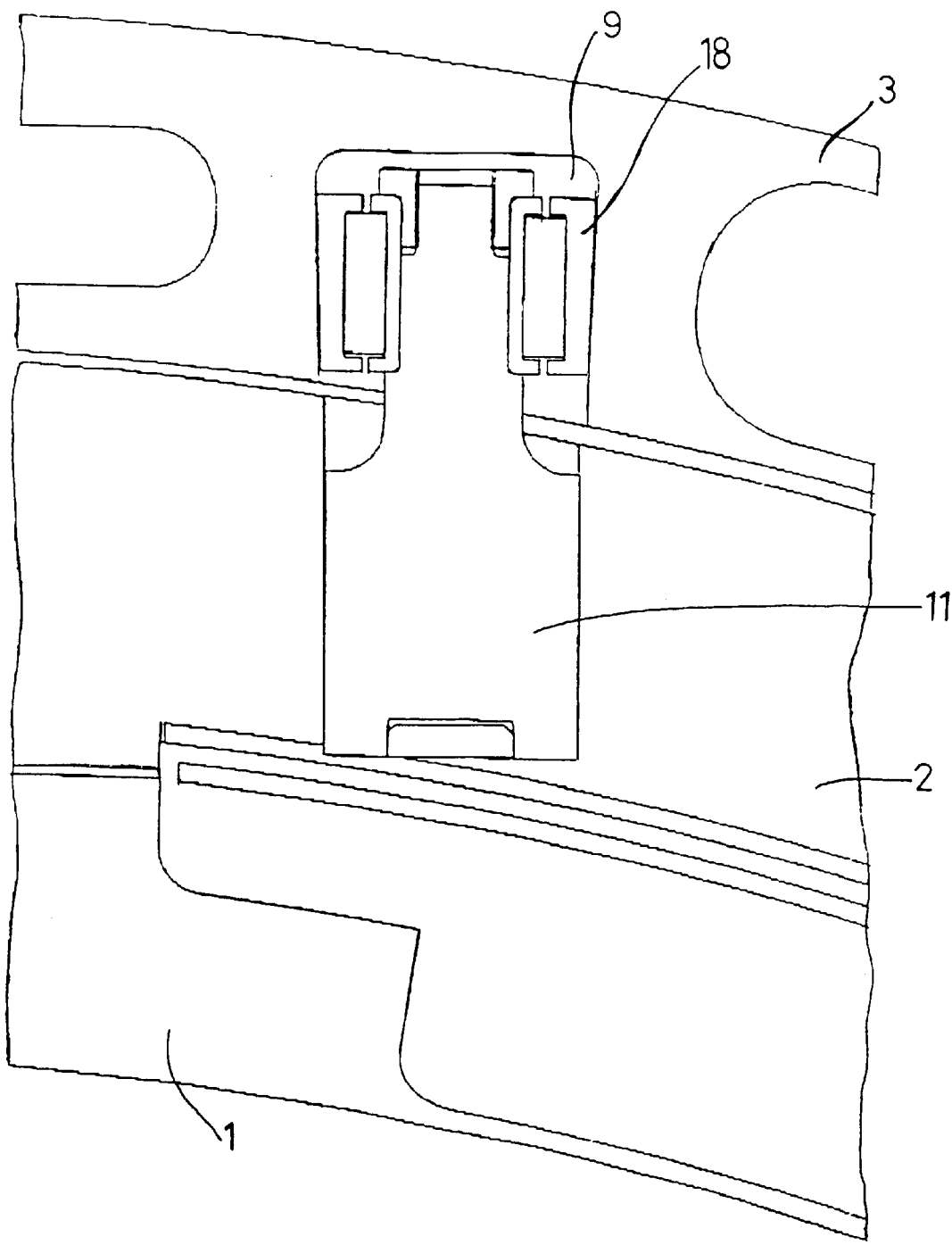
Figure 4:
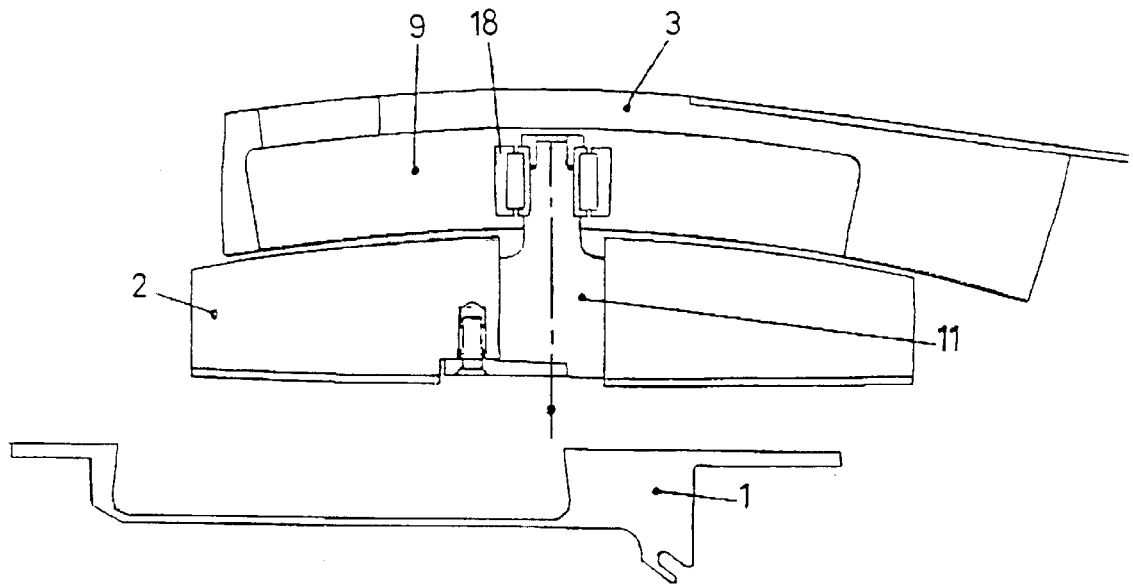
Figure 5:
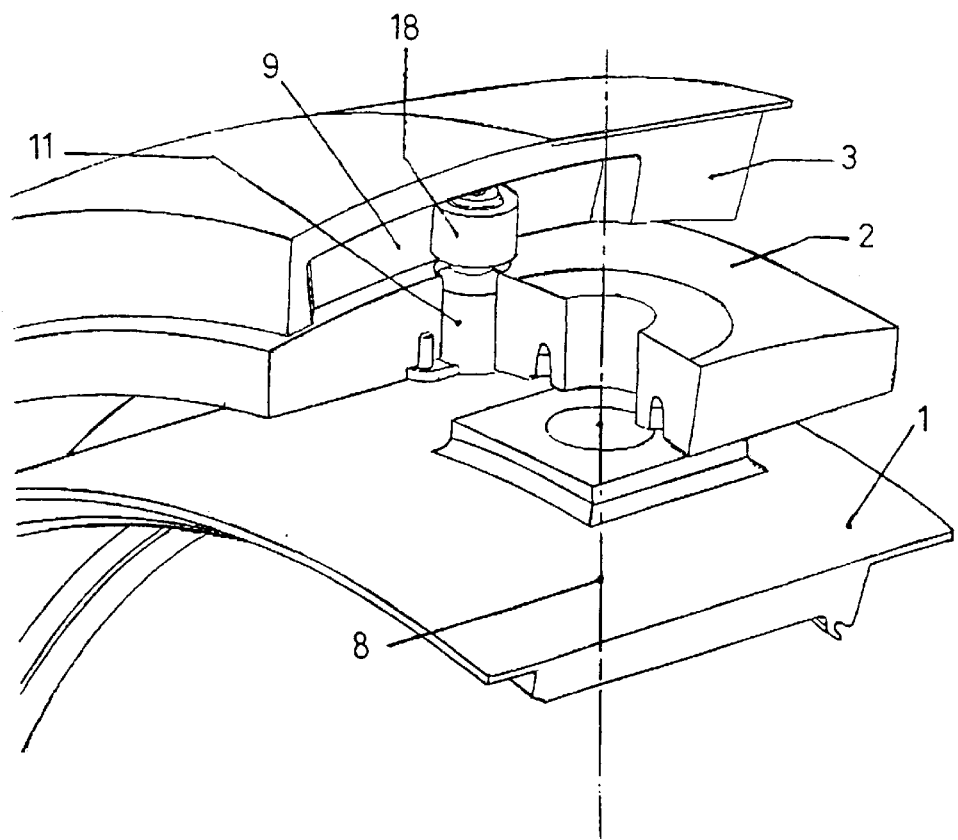

FIG. 2 is a perspective drawing showing a partial cutaway of the ring and the guiding elements of the invention FIG. 3 is an alternative of the guiding mechanism that incorporates rollers, bushings or bearings between moving elements FIG. 4 is a section parallel to the engine axis, showing the guiding mechanism on the outer ring FIG. 5 is a partial cutaway perspective drawing showing the guiding mechanism on the outer ring.

Figure 6:
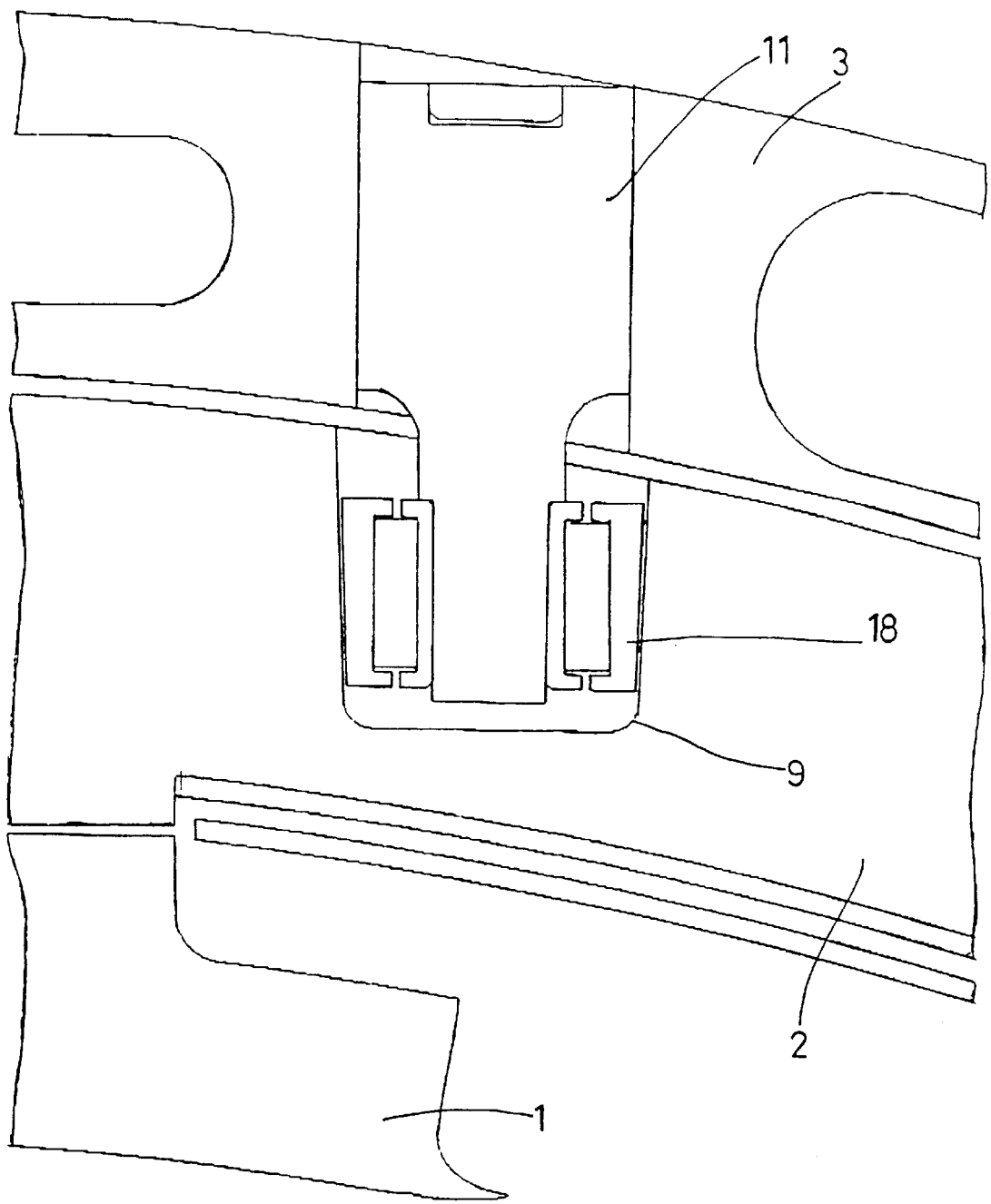
Figure 7:
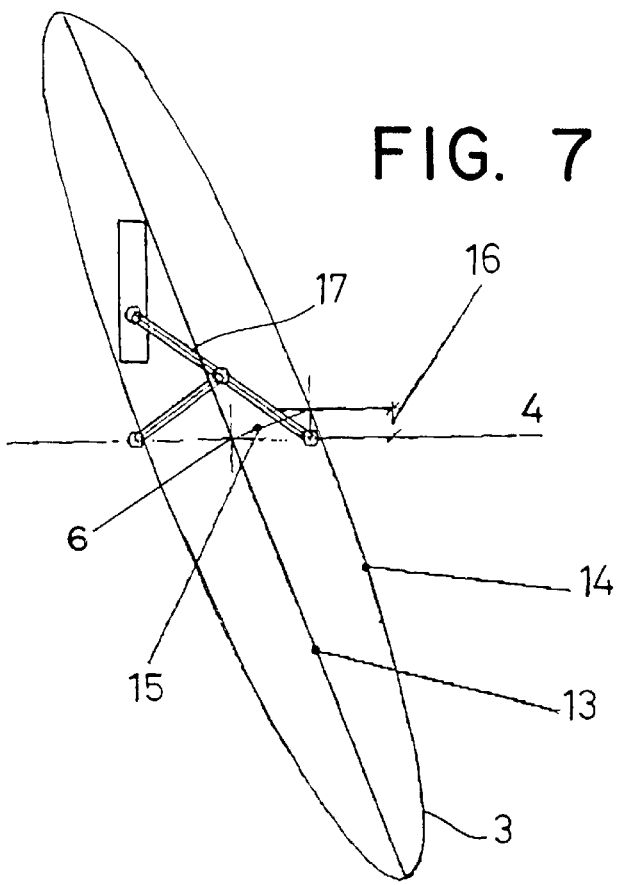

FIG. 6 is an alternative guiding system with the inverted relative position of roller and track FIG. 7 shows the problems associated with conventional guiding elements for the external ring when vectoring on the vertical and horizontal planes.

Figure 8:
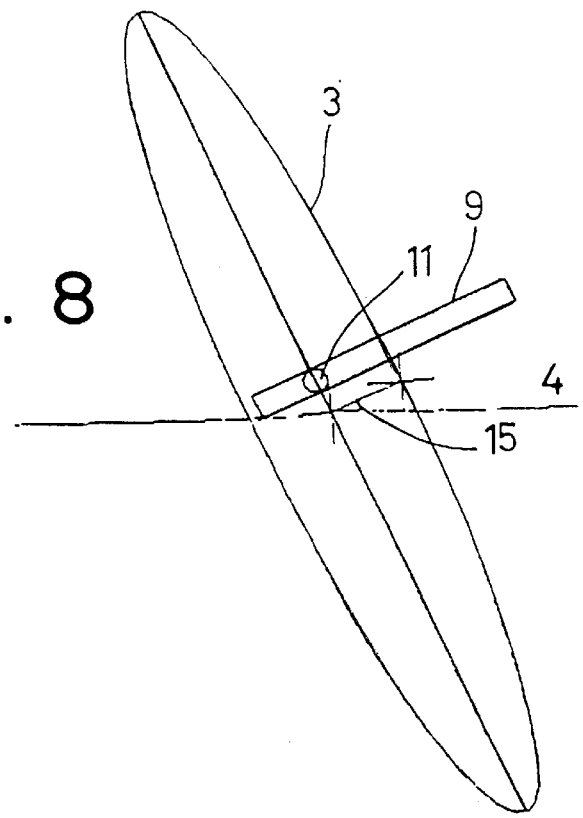

FIG. 8 shows how the guiding system of the invention avoids the problems associated with the known mechanism The drawings show an actuation mechanism consisting of three rings with associated numbers 1,2 and 3 which are concentric between them and with the nozzle axis 4. Rings 1 and 2 are related between them by the two joints 5, on line and at opposite diametral positions, defining a pivoting axis 6. Rings 2 and 3 are related by joints 7, aligned and on opposite diametral positions, defining a pivoting axis 8. The axis 6 and 8 are perpendicular between them, such that the three ring arrangement make up a cardan or universal joint arrangement.

The outer ring 3 has a track 9 which is orientated circunferencially around the axis 8. The intermediate ring 2 incorporates a track 10 orientated circunferencially around the axis 6 which is perpendicular to the previous. The sledge element 11 which is joined to the intermediate ring 2, slides on the tract 9 for vectoring components around axis 8. For components of vectoring around axis 6, the sledge element 12 which is joined to the inner ring 1, slides on the track 10.

The invention solves the problem associated with the cardan joint between rings, which is incompatible with the conventional guiding elements of the external ring 3 by direct joint to the nozzle fixed structure as is shown in FIGS. 7 and 8.

The figures show two positions of the outer ring 3 according to an orientation in which the engine axis is in parallel and the axis 6 perpendicular to the drawing plane. Line 13 describes the position of the outer ring 3 the immediate ring 2 and the cylindrical joint between them 8, when the direction of vectoring is the corresponding to a rotation around axis 6. The ellipse 14 describes the position of the outer ring 3 when it rotates around the cylindrical joint 8 between external 3 and intermediate ring 2 from the initial position represented by line 13. The position of the external ring 3 represented by the ellipse 14 corresponds to intermediate circunferencial vectoring directions between axis 6 and 8. For directions such as the described, a point of the external ring 3 describes a trajectory represented by the line 15, that introduces, as can be observed, a component of displacement 16 of the outer ring 3 perpendicular to the plane defined by the engine axis 4 and the axis 6. The guiding system must therefore allow the displacement 16 of the external ring 3, withstanding at the same time forces of the same direction that result from vectoring.

A conventional system 17, rigid and joined to the engine structure, would move on the plane defined by the engine axis 4 and the axis 6, as is shown on FIG. 7. If the guiding system 17 were flexible and compatible with movement 16, it would not be capable of withstanding tangential forces on the outer ring 3. FIG. 8 shows how the guiding system of the invention solves the described incompatibility by orientating the track 11 of the outer ring 3 in the direction of the displacement 15.

The sytem can incorporate a roller, bushing, or roller, joined to the sledge element 11 or 12, for minimizing the friction and wear with the track 9 or 10. The position of sledge 11 or 12 and the track 9 or 10 can also be inverted with respect to the position of the rings 2 and 3 or 1 and 2 as is illustrated in FIG. 6.

Technical Advantages

The proposed system avoids the complexity required for offering resistance to tangential forces that result from lateral forces under vectoring, allowing at the same time lateral displacements of the same nature of those that must be avoided under combined horizontal and vertical vectoring.

Reduction of mechanical elements and weight.

What is claimed is:

1. Actuation mechanism for variable geometry vectoring nozzles for gas turbine engines, comprising:

a plurality of rings arranged concentrically about an axis of the engine, said plurality of rings comprising:
an internal ring, an intermediate ring and an external ring containing a nozzle having a divergent section;

one of bushings and aligned elements interconnecting respective pairs of the plurality of rings; said bushings and aligned elements permitting relative rotation of the rings with respective to each other around a pair of axes which are perpendicular to the axis of engine;

at least one sliding track located on one ring of the plurality of rings, and a sledge element located on an opposite ring of the plurality of rings, said sledge element engaging and sliding on the at least one track, wherein the at least one track is orientated circumferentially around the axis adjoining two rings of the plurality of rings, and tangential forces, induced as a result of thrust vectoring, are transmitted by the divergent section of the nozzle on the external ring of the plurality of rings to the internal ring of the plurality of rings, without requiring a direct joint between the external ring and any nozzle structure.

2. The actuation mechanism of claim 1 wherein the two rings of the plurality of rings comprises:

two sliding joints and an equal number of associated sledges, and wherein the at least one track is located at diametrically opposite positions and at different sides of a joint between a rotation axis of the axis of the adjoining two rings.

3. The actuation mechanism of claim 1 wherein the sledge element comprises one of rollers and bushings for contacting said at least one track.

4. The actuation mechanism of claim 1 wherein, on each consecutive ring couple, the at least one sliding track and a rolling track consists of a curved slot on one of the rings, concentric with a pivoting axis between the ring couple, and in which the at least one sledge element of an associated ring is located.

5. The actuation mechanism of claim 1 wherein the plurality of rings comprise three rings.

6. The actuation mechanism of claim 5 wherein the three rings are cardan joints.

* * * * *

UNITED STATES PATENT AND TRADEMARK OFFICE
CERTIFICATE OF CORRECTION

PATENT NO. : 6,311,478 B1
DATED : November 6, 2001
INVENTOR(S) : Javier Elorriaga Vicario It is certified that error appears in the above-identified patent and that said Letters Patent is hereby corrected as shown below:

<u>Title page,</u>
Item [73], Assignee, change "Industria de Turbo, S.A., Zamudio (ES)" to
-- Industria de Turbo Propulsores, S.A., Zamudio (ES) --

Signed and Sealed this

Thirtieth Day of July, 2002

*Attest:*

*Attesting Officer*

JAMES E. ROGAN
*Director of the United States Patent and Trademark Office*